(12) United States Patent
Long et al.

(10) Patent No.: US 11,801,514 B1
(45) Date of Patent: Oct. 31, 2023

(54) MECHANOCHEMICAL PRODUCTION OF TUNABLE PLANAR MATERIALS

(71) Applicant: CR Nano, Inc., Knoxville, TN (US)

(72) Inventors: Jedidiah Long, Clinton, TN (US); Austin Staub, Knoxville, TN (US); Nicholas Ciparro, Knoxville, TN (US)

(73) Assignee: CR Nano, Inc., Knoxville, TN (US)

( * ) Notice: Subject to any disclaimer, the term of this patent is extended or adjusted under 35 U.S.C. 154(b) by 0 days.

(21) Appl. No.: 18/167,604

(22) Filed: Feb. 10, 2023

(51) Int. Cl.
*B02C 17/00* (2006.01)
*B82Y 40/00* (2011.01)
*B82Y 30/00* (2011.01)
*B82B 3/00* (2006.01)
*B02C 19/18* (2006.01)

(52) U.S. Cl.
CPC ............ *B02C 17/002* (2013.01); *B02C 19/18* (2013.01); *B82B 3/0004* (2013.01); *B82Y 30/00* (2013.01); *B82Y 40/00* (2013.01)

(58) Field of Classification Search
CPC ................................ B82Y 30/00; B82Y 40/00
See application file for complete search history.

(56) References Cited

U.S. PATENT DOCUMENTS

| | | | |
|---|---|---|---|
| 7,896,267 B2 | 3/2011 | Ishigaki et al. | |
| 8,132,746 B2 | 3/2012 | Zhamu et al. | |
| 9,751,760 B2 | 9/2017 | Coleman et al. | |
| 9,837,181 B2 | 12/2017 | Texter | |
| 9,899,672 B2 | 2/2018 | Zhamu et al. | |
| 10,304,937 B2 | 5/2019 | Coleman et al. | |
| 10,335,755 B1 | 7/2019 | Shin et al. | |
| 10,906,814 B2 | 2/2021 | Karagiannidis et al. | |
| 2005/0008557 A1 | 1/2005 | Yadav et al. | |
| 2007/0071825 A1 | 3/2007 | Curdy et al. | |
| 2009/0206186 A1 | 8/2009 | Morrison et al. | |
| 2012/0019341 A1 | 1/2012 | Gabay et al. | |

(Continued)

FOREIGN PATENT DOCUMENTS

| | | |
|---|---|---|
| WO | 2012028724 A1 | 3/2012 |
| WO | 2017089987 A1 | 6/2017 |
| WO | 2020146337 A1 | 7/2020 |

OTHER PUBLICATIONS

International Search Report and Written Opinion for PCT/US23/12822, dated May 10, 2023, 12 pages.

*Primary Examiner* — Bobby Yeonjin Kim
(74) *Attorney, Agent, or Firm* — Chambliss, Bahner & Stophel, P.C.; Stephen D. Adams (57) ABSTRACT

A particle size reducing method using a ball mill, a vortexer, a Taylor-Couette flow-inducing device (TCFID), a homogenizer, and a dryer. A feedstock with a first particle size is provided to the processing system. In the ball mill, the particle size of the feedstock is reduced to a second particle size. The feedstock is mixed with a carrier fluid to create a working fluid, wherein particles of the feedstock are suspended within the carrier fluid. The particle size is reduced to a third particle size in the vortexer, producing a second reduced working fluid. The third particle size is reduced with the TCFID to a fourth particle size, producing a third reduced working fluid. Using the homogenizer, the distribution of particles in the third reduced working fluid is normalized. In the dryer, the carrier fluid of the working fluid is separated from the particles to produce a granular material.

15 Claims, 8 Drawing Sheets

(56) References Cited

U.S. PATENT DOCUMENTS

| | | |
|---|---|---|
| 2016/0082404 A1 | 3/2016 | Pigos |
| 2017/0145118 A1 | 5/2017 | Hosaka et al. |
| 2019/0051934 A1* | 2/2019 | Kim .................... H01M 10/052 |
| 2019/0093239 A1 | 3/2019 | Shinde et al. |
| 2019/0176161 A1 | 6/2019 | Beliavsky |
| 2020/0255294 A1 | 8/2020 | Stafford et al. |
| 2021/0107793 A1 | 4/2021 | Edwards et al. |
| 2021/0114880 A1* | 4/2021 | Lin ......................... C01B 32/19 |
| 2021/0371287 A1 | 12/2021 | Dalton et al. |

* cited by examiner

MECHANOCHEMICAL PRODUCTION OF TUNABLE PLANAR MATERIALS

FIELD

The present invention relates to the reduction of material particle size. More particularly, the present invention relates to a system and a method for reducing the size of particulate matter utilizing a carrier fluid and high shear forces to separate groups of particulates from other groups of particulates or to exfoliate layers of the particulate.

BACKGROUND

Many materials exist, including manmade and naturally occurring materials, with a particle group structure (including size) and shape that is too large for practical use in certain applications. In some materials, reducing the size and/or shape of the particle group imparts or brings forth desirable characteristics within the material. For example, naturally occurring graphite gains many desirable properties like increased strength and electrical conductivity when it is reduced in shape and size to produce graphene. Additionally, graphite can be reduced from its natural, flaky state to a fine powder state by a reduction in particle size. As another example, as metals like carbides, nitrides, or carbonitrides, are reduced in particle size and shape to produce MXenes (i.e., two-dimensional inorganic compounds), the materials become, in some instances, hydrophilic or antibacterial. The production of these particles with a reduced particle size and shape, including down to a nano-scale in order to produce a "nanomaterial", allows the materials to be used in a variety of applications. For example, certain nanomaterials are suitable for use in solar panels, electrodes, optical films, coatings, nanocomposite materials, batteries, fuel cells, antennas, superconductive devices, and more.

Two size-reduction methods are conventionally used to reduce the size of particle groups, including creating nanomaterials. The first method involves reducing the particle group into constituent layers of particles. This process is called exfoliation. The second method involves an overall reduction in particle size but not a separation of the layers making up the particle group. This process is called micronization. In particle groups where the first method of size-reduction is used (i.e., the separation or exfoliation of individual layers), the particle groups generally have a molecular structure resembling a stack of layers. Each layer includes a number of particles that share strong, intra-planar bonds (i.e., bonds connecting particles within a single layer together). A series of weaker inter-planar bonds connect the layers within the stack (i.e., bonds connecting particles in different layers together). Using exfoliation, typically only the weaker inter-planar bonds are severed, resulting in separated, individual layers. On the other hand, using micronization, both inter-planar and intra-planar bonds are typically severed, which leaves a material having a similar makeup as the original material but also having an overall reduced particle size. As a result, in certain instances, the same precursor material can result in the production of two different nanomaterials, depending on the type of size reduction that it undergoes. For example, graphite subjected to exfoliation results in graphene, while graphite subjected to micronization results in micronized graphite.

Current production methods for nanomaterials are highly specific to both the precursor material and the desired finished product. Generally, reducing the size of a particle group requires a precise shear force to break the bonds making up the particle group. If undesirable shear forces are utilized, the particle size will either not be reduced enough or might be reduced too much and, in either case, the particle group might be rendered useless for the desired purpose. For example, a process or system designed to produce graphite might not be suitable (or ideal) to produce micronized graphite even though both materials are created by reducing the particle size of the same precursor material (i.e., graphite). Similarly, a process or system to create MXenes via exfoliation might not suffice to create powdered carbides via micronization. Thus, a system suitable for controlled exfoliation of one precursor material may not be suitable for controlled micronization of the same or a different precursor material and vice-versa.

Additionally, because of the highly specific nature of current production methods and systems, certain beneficial nanomaterials are commercially unfeasible despite the beneficial properties of the nanomaterial. In addition, many current production methods and systems rely on single-use solvents, which can add to both the monetary and environmental cost of production. Finally, many current production methods and systems utilize production equipment, such as pumps, to transfer material within the system, which can cause or enable the reduced-sized particle groups to reconstitute into their larger, original state (i.e., re-aggregate or re-agglomerate), thus requiring reprocessing of the material to achieve the desired size reduction.

Therefore, what is needed is an improved mechanochemical process and system capable of achieving variable (i.e., tunable) shear forces for reducing particle size in a variety of materials and to achieve the desired particle sizes while also avoiding processing steps likely to cause reconstitution of the reduced-size particle groups.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value, which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

As used herein, the term "particle" may refer, interchangeably, to atom, molecule, ion, and the like and the specific definition of the term in each instance is dictated by context. The term "particle group" refers to two or more particles that are bonded together. The term "particle size" refers to the size of a particle group.

As used herein, the term "size" in the context of a particle physical dimension and the reduction thereof means a reduction and narrowing of a particle size distribution or average particle size.

As used herein, the term "micronize" and "micronization" means a mechanical and high shearing operation for reducing or downsizing the average size of a solid material's particles.

As used herein, the term "exfoliate" means to separate or to shed from a surface in layers.

As used herein, the term "functionalize" means to cause to be functional or to provide with some function, feature, capability, or property, including by changing the chemistry of the material.

The "Reynolds number" is a dimensionless number in fluid dynamics that may be used to determine whether and the degree to which a fluid is laminar (i.e., steady) or turbulent (i.e., unsteady). For example, when the Reynolds number is less than about 2,000, flow in a pipe is considered laminar. On the other hand, when the Reynolds number is greater than above 2,000, flow in a pipe is considered turbulent.

The "Taylor number" is a dimensionless quantity that characterizes inertial forces of a fluid rotating about an axis relative to viscous forces. For two concentric rotating cylinders, it is defined by the following equation:

$$T_a = \frac{\Omega^2 R_1 (R_2 - R_1)^3}{\nu^2}$$

where $\Omega$ is a characteristic of angular velocity, $R_1$ is the radius of the internal cylinder, $R_2$ is the radius of the external cylinder, and $\nu$ is the kinematic viscosity. The Taylor number describes the onset of vortices within the flow.

SUMMARY OF THE CLAIMS

The above and other problems may be addressed by a particle size reducing method of the present invention. According to one embodiment, a mechanochemical processing system is provided. The mechanochemical processing system preferably includes a ball mill, a vortexer, a Taylor-Couette flow-inducing device (TCFID), a homogenizer, and a dryer. The mechanochemical processing system may be used in connection with a feedstock having of a particle group with a first particle size and that is formed by intra-planar bonds connecting particles within a single layer together and inter-planar bonds that are weaker than the intra-planar bonds and that connect particles of one layer together with particles of a different layer. With the ball mill, the particle size of the feedstock is reduced from the first particle size to a smaller second particle size. The feedstock is mixed with a carrier fluid to create a working fluid wherein the particles are suspended within the carrier fluid. In certain cases, the carrier fluid includes at least one of the following: a solvent, a surfactant, a viscosity modifier, a surface tension modifier, an intercalation agent, a swelling agent, or a homogenizing agent. In some cases, the carrier fluid is comprised of acetone and water. In certain embodiments, one or more vacuum traps are used to transfer the working fluid between at least two components of the processing system.

Using the vortexer, the particle size of the feedstock is reduced from the second particle size to a smaller third particle size to produce a second reduced working fluid. With the TCFID, the third particle size of the feedstock is reduced to a smaller fourth particle size to produce a third reduced working fluid. With the homogenizer, a distribution of the particles in the third reduced working fluid is normalized. In the dryer, the carrier fluid of the working fluid is separated from the particles to produce a granular material. In certain embodiments, the granular material is comprised of at least one of the following: hexagonal boron nitride, MXene, Graphene, Graphene Oxide, Reduced Graphene Oxide, Functionalized Graphene, Non-Functionalized Graphene, Micronized Graphite, Molybdenum Disulfide, Nanoclay, Niobium Diselenide, Lead, Lead Oxide, or Polymer Gel.

In certain embodiments, the working fluid is held within a gap formed between a first cylinder and a second cylinder of the TCFID for a dwell time while at least one of the first cylinder or second cylinder rotates in order to induce a desired Reynolds number within the working fluid. In some cases, the working fluid is held within the gap as the first cylinder rotates at a first speed and in a first direction and the second cylinder rotates at a second speed and in a second direction. The first direction may be opposite the second direction. However, in other cases, the first direction is the same as the second direction.

In certain embodiments, the method also includes the step of atomizing the third reduced working fluid into a fluidized bed using a spray atomizer and passing a gas through the fluidized bed in order to dry and separate the particles from the third reduced working fluid. In some cases, the third reduced working fluid is atomized into a fluidized bed using a spray atomizer and a gas is passed through the fluidized bed in order to functionalize particles suspended within the carrier fluid. In some cases, the particles suspended within the carrier fluid are functionalized in a bubble column reactor. In certain embodiments, the carrier fluid that is separated from the feedstock material by the dryer is captured and condensed. For example, in some cases, the dryer is a centrifuge configured to capture and condense the carrier fluid. In certain cases, the dryer is a filtration system and the granular material is separated from the carrier fluid and captured using the filtration system.

The present disclosure also provides a vortexer for reducing a particle size of a feedstock suspended within a carrier fluid that forms a working fluid. In certain embodiments, the vortexer includes a cylindrical tank having a tank wall, a first end, an opposing second end, and a hollow interior cavity for holding a working fluid. Additionally, a first drive motor is disposed outside the interior cavity of the cylindrical tank, a first shear head is located within the interior cavity, a first drive shaft is operatively connected between the first drive motor and the first shear head, a first shear gap is located between an outside edge of the first shear head and an inner surface of the tank wall, and a first sealed bearing provides a liquid-tight seal between the first drive shaft and the cylindrical tank and permits rotation of the first drive shaft with respect to the cylindrical tank.

In certain embodiments, the vortexer further includes a second drive motor located outside the interior cavity of the cylindrical tank, a second shear head located within the interior cavity, a second drive shaft operatively connected between the second drive motor and the second shear head, a second shear gap formed between an outside edge of the second shear head and the inner surface of the tank wall, and a second sealed bearing providing a liquid-tight seal between the second drive shaft and the cylindrical tank and permitting rotation of the second drive shaft with respect to the cylindrical tank.

The present disclosure also provides a mechanochemical processing system for reducing a particle size of a feedstock using the above-described vortexer. In addition to the vortexer, the mechanochemical system also preferably includes a ball mill for pulverizing the feedstock to reduce the particle size from the first particle size to a smaller second particle size, a Taylor-Couette flow-inducing device (TCFID) configured to reduce the particle size from the second particle size to a smaller third particle size to produce a third reduced working fluid, a homogenizer to normalize a distribution of the particles in the third reduced working fluid, and a dryer for separating the carrier fluid of the third working fluid from the particles to produce a granular material. In certain cases, the TCFID comprises a first cylinder having a hollow and a second cylinder disposed within the hollow of the first cylinder such that a gap is formed between the first cylinder and the second cylinder. The working fluid preferably remains within and travels through the gap during a dwell time while at least one of the first cylinder or second cylinder is rotated in order to induce a desired Reynolds number within the working fluid.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
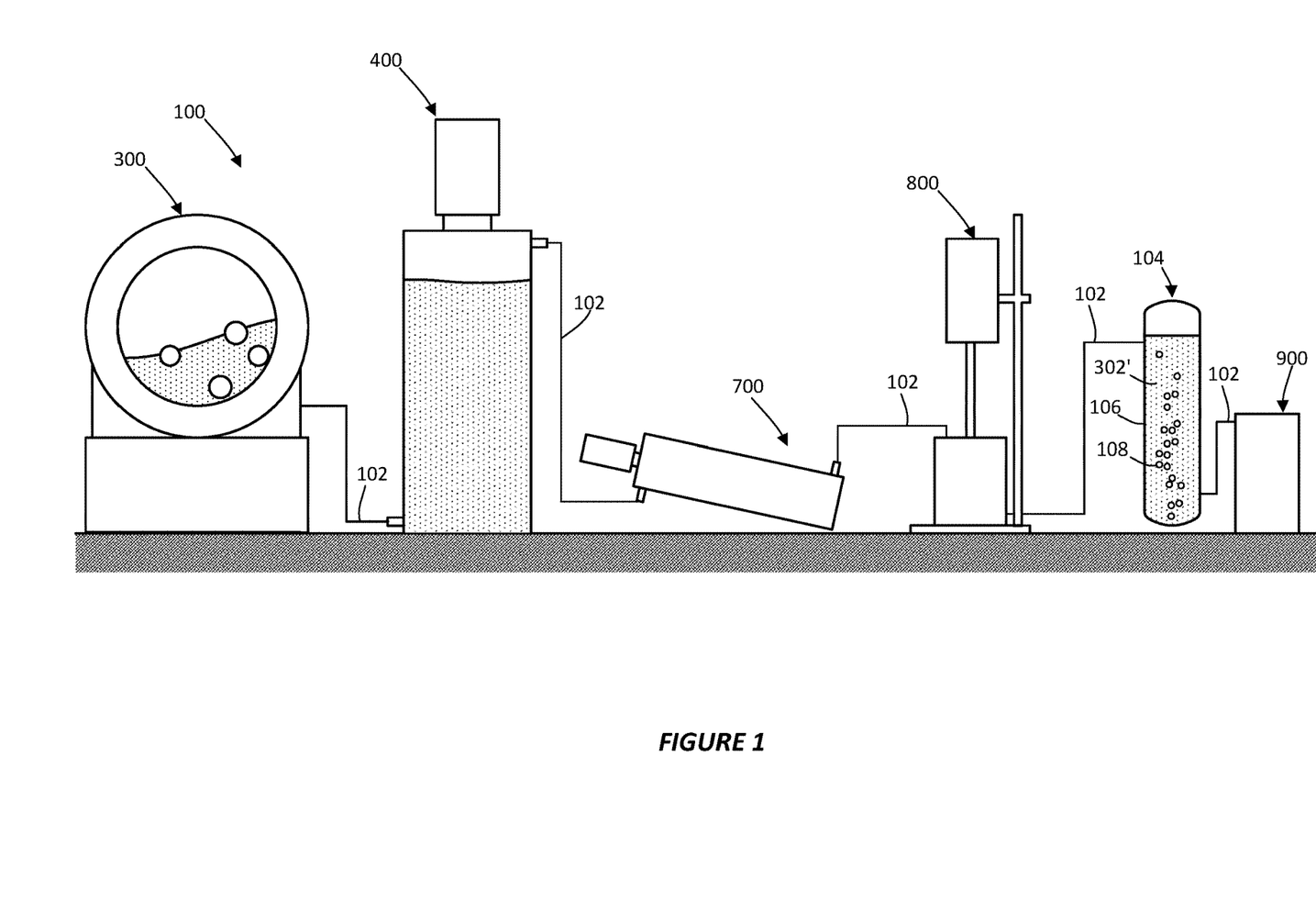
FIG. 1 is an elevation view depicting a system for reducing particle size according to an embodiment of the present invention.

Referring now to the drawings in which like reference characters designate like or corresponding characters throughout the several views, there is shown in FIG. 1 a system 100 for reducing the particle size of a particle group utilizing mechanochemical processes according to an embodiment of the present invention. In preferred embodiments, the system 100 includes a ball mill 300, a vortexer 400, a Taylor-Couette flow-inducing device (TCFID) 700, a homogenizer 800, and a dryer 900. Certain embodiments of the system 100 include a second ball mill (not shown but similar or identical to ball mill 300). In some embodiments, the system 100 includes a bubble column reactor 104. Using this system 100, a feedstock material may be exposed to processes that precisely and accurately reduce the particle size of that feedstock material to a user-selected (i.e., tunable) particle size in order to attain a resulting product having the desired size characteristics. In particular, by exposing the feedstock to mechanical/physical size reduction processes, detailed below, the particle group can be micronized or exfoliated in order to reduce the overall particle size. Further details concerning each component and its function in the presently disclosed method are provided below.

Figure 2:
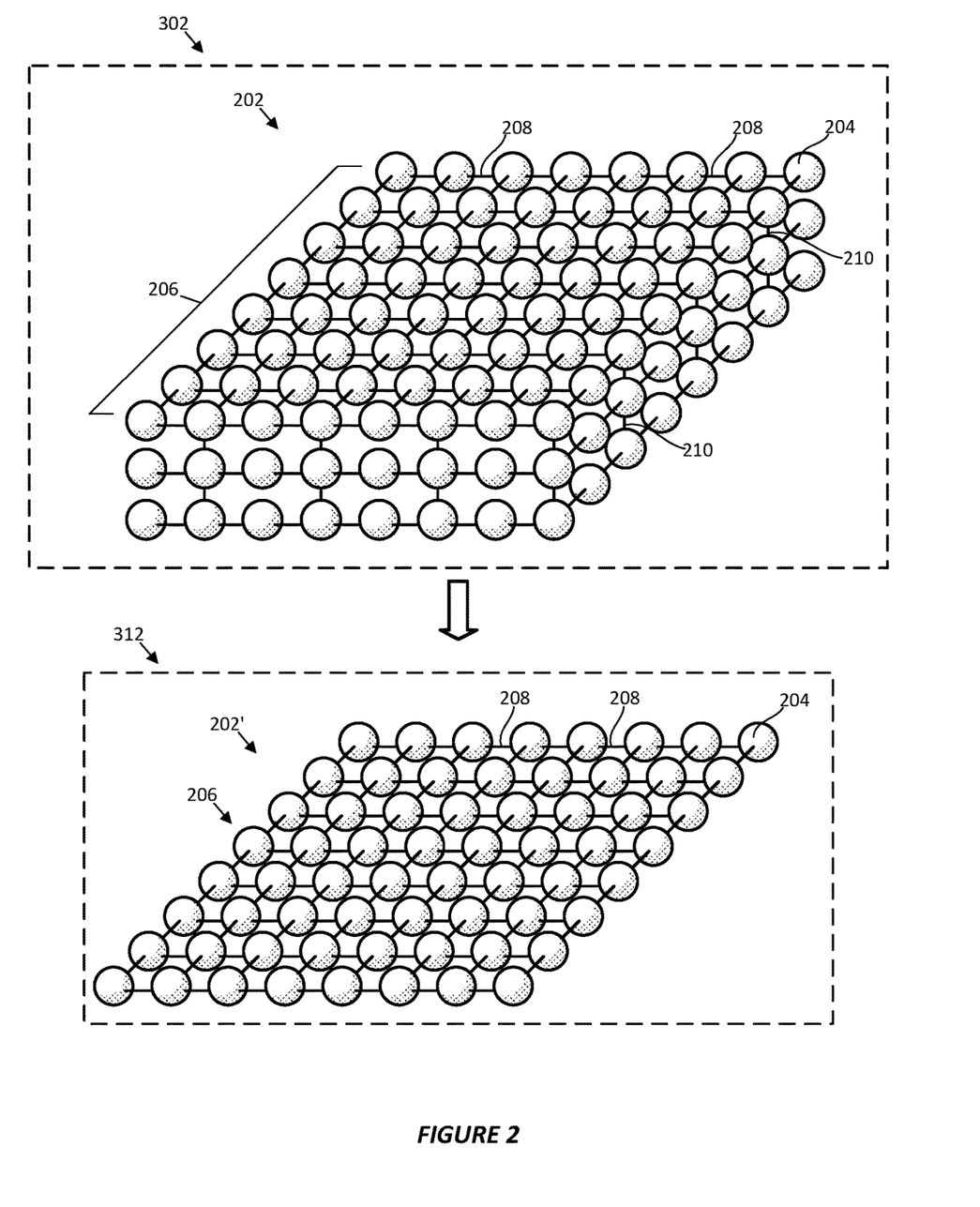
FIG. 2 is a perspective view depicting an exemplary particle group before and after being processed using the system of FIG. 1.

FIG. 2 depicts an exemplary particle group 202 having a particle size that makes up a feedstock 302 of a selected material, and where the particle size may be reduced using the system 100 shown in FIG. 1 to produce a desired product 312 comprising a particle group 202' having a reduced particle size. Each particle group 202 (and 202') is made up of a large number of individual particles 204 that are bonded together and that may be arranged in a variety of shapes. In the illustrated case, particles 204 are arranged primarily in planes or layers 206 (i.e., in an 8×8 grid). Each layer 206 is made up of particles 204 sharing intra-planar bonds 208 (i.e., bonds joining particles together within a single layer). On the other hand, inter-planar bonds 210 connect particles 204 of one layer 206 together with particles of another layer 206, which creates a stack of layers (i.e., three 8×8 grids). Typically, the inter-planar bonds 210 are weaker or fewer in number than the intra-planar bonds 208. In certain embodiments, as the system 100 reduces the particle size of the particle group 202, the inter-planar bonds 210 are broken, resulting in a plurality of individual layers 206 as the final product (e.g., a single 8×8 grid or layer 206). In other embodiments, some or all of the intra-planar bonds 208 and/or some or all of the inter-planar bonds 210 are broken, resulting in an individual particle or a group of particles (i.e., single layer or multi-layer) having a reduced particle size as the final product. Particles 204 and particle groups 202 may include inorganic or organic materials, including but not limited to, hexagonal boron nitride, MXenes, forms of graphene (e.g., graphene oxide, reduced graphene oxide, functionalized graphene), micronized graphite, Molybdenum Disulfide, Nanoclays, Niobium Diselenide, Lead, Lead Oxide, and Polymer Gels.

With reference to FIGS. 1 and 2, during the process of reducing the particle size of feedstock, feedstock is transferred between the various components of the system 100. In certain embodiments, this transfer is made utilizing vacuum traps 102, which may be located between each of the system components including the ball mill 300 and the vortexer 400.

Other vacuum traps 102 may be located between the other components of system 100 to further transfer the feedstock. In other embodiments, some or all of the components of system 100 are arranged to allow for a gravity-assisted transfer of material. For example, some or all of the components of the system 100 may be arranged in one or more stacked configurations in order to allow feedstock to be transferred from one system component to another system component partially or entirely under the force of gravity. It may be appreciated that, under certain circumstances, clumping or the recombination of size-reduced particle groups into larger particle groups may occur but is preferably avoided. For that reason, in most cases, pumps are preferably avoided (i.e., not used) at all points throughout the process in order to avoid the risk of the feedstock recombining into the larger-sized particle groups.

In certain embodiments, to further assist with transfer of the feedstock, a carrier fluid may be combined with the feedstock 302 in order to create a working fluid 302' (FIG. 1) that is more readily transferred between the components of the system 100, including via the vacuum traps 102. In certain embodiments, the carrier fluid, including its chemical makeup, is chosen based on the particle group 202 that is to be reduced in order to provide a more efficient or effective reduction in the particle size of the feedstock material. As noted above, the particle group 202 generally includes a series of layers 206 of bonded particles 204. During the particle size reduction process of the present disclosure, some or all of the intra-planar bonds 208 or inter-planar bonds 210 are broken at various rates, resulting in either a reduced size particle group 202 (i.e., micronization) or in individual layers 206 (i.e., exfoliation). To sever the bonds 208, 210, specific forces are provided within the working fluid 302'. To induce these forces and to sever the bonds 208, 210 efficiently, the carrier fluid preferably has a preferred viscosity, surface tension, and other properties. Accordingly, the properties and makeup of an appropriate carrier fluid may depend on a number of factors, including the specific particles making up the feedstock, the desired reduction in particle size, and the forces required to achieve the desired amount of size reduction. Carrier fluids must sufficiently wet the variety of particle groups being reduced. Absent sufficient wetting of the particle groups, the carrier fluid will not appropriately aid in the micronization or exfoliation of the particle groups. The carrier fluid must also have a specific viscosity to achieve the required Reynolds Number and Taylor Number to exfoliate or micronize the particle groups as the working fluid undergoes the various processes within the system 100. For example, in certain cases, the carrier fluid may include at least one of the following: a polar/nonpolar solvent; a surfactant, including organic surfactants (e.g., oils, alcohols, etc.), inorganic surfactants (e.g., acids or bases), or ionic surfactants; a viscosity modifier; a surface tension modifier; an intercalation or swelling agent that promotes dispersion and/or suspension of particles in fluid; and a homogenizing agent. The carrier fluid constituents may be miscible or immiscible with one another. However, in each case, the carrier fluid preferably disposes and suspends the particles of the feedstock within the carrier fluid. As a specific example, in certain embodiments, the carrier fluid is comprised of acetone and water. It has been discovered that, advantageously, acetone sufficiently wets the feedstock material to assist in its exfoliation. The viscosity of a water and acetone mixture also produces a Reynolds number and a Taylor number that is appropriate for generating turbulent flow for micronizing and exfoliating the feedstock material. Additionally, acetone dries very quickly, which simplifies the extraction of the finished product from the carrier fluid. In other cases, for carrier fluids having different viscosities, settings of the system, such as its operating speeds, may be modified to attain the desired Reynolds and Taylor numbers.

In certain embodiments, the carrier fluid is mixed with the feedstock material within the ball mill 300. For example, in certain preferred embodiments, the feedstock 302 is poured in powdered form into the ball mill 300 along with the carrier fluid to create the working fluid 302'. However, in other embodiments, the feedstock 302 is mixed with the carrier fluid or one or more of the other agents described above (e.g., including an intercalation/swelling agent) to form the working fluid before placement into the ball mill 300 in a pretreatment step. For example, in certain preferred embodiments, the working fluid 302' is provided to a bubble column reactor 104 or to a fluidized bed 900 (FIG. 9) to introduce a gaseous phase or constituent (e.g., carbonization to introduce $CO_2$) and to impart desirable characteristics on, or functionalize, the particles of feedstock 302 suspended within the working fluid.

In the illustrated embodiment, the working fluid 302' is provided to a bubble column reactor 104 prior to drying in the dryer 900. The bubble column reactor 104 introduces a gaseous phase or constituent (e.g., carbonization to introduce CO2) and imparts desirable characteristics on, or functionalizes, the particles of feedstock 302 suspended within the working fluid. The bubble column reactor 104 includes a vertical cylindrical column 106 designed to hold the working fluid 302' while allowing a gas 108, in the form of bubbles, to pass through the working fluid. As the bubbles of gas 108 pass through the working fluid 302', turbulence is created within the working fluid and the gas is absorbed by the particles of feedstock suspended within the working fluid. Non-limiting examples of suitable gasses 108 that may be used in this process include chlorine, oxygen, methane, ammonia, and isobutene. Although it is preferable to provide the working fluid 302' to the bubble column reactor 104 before further processing, the working fluid can, alternatively, be provided to the bubble column reactor at any step within the process before the drying process discussed below.

Figure 3:
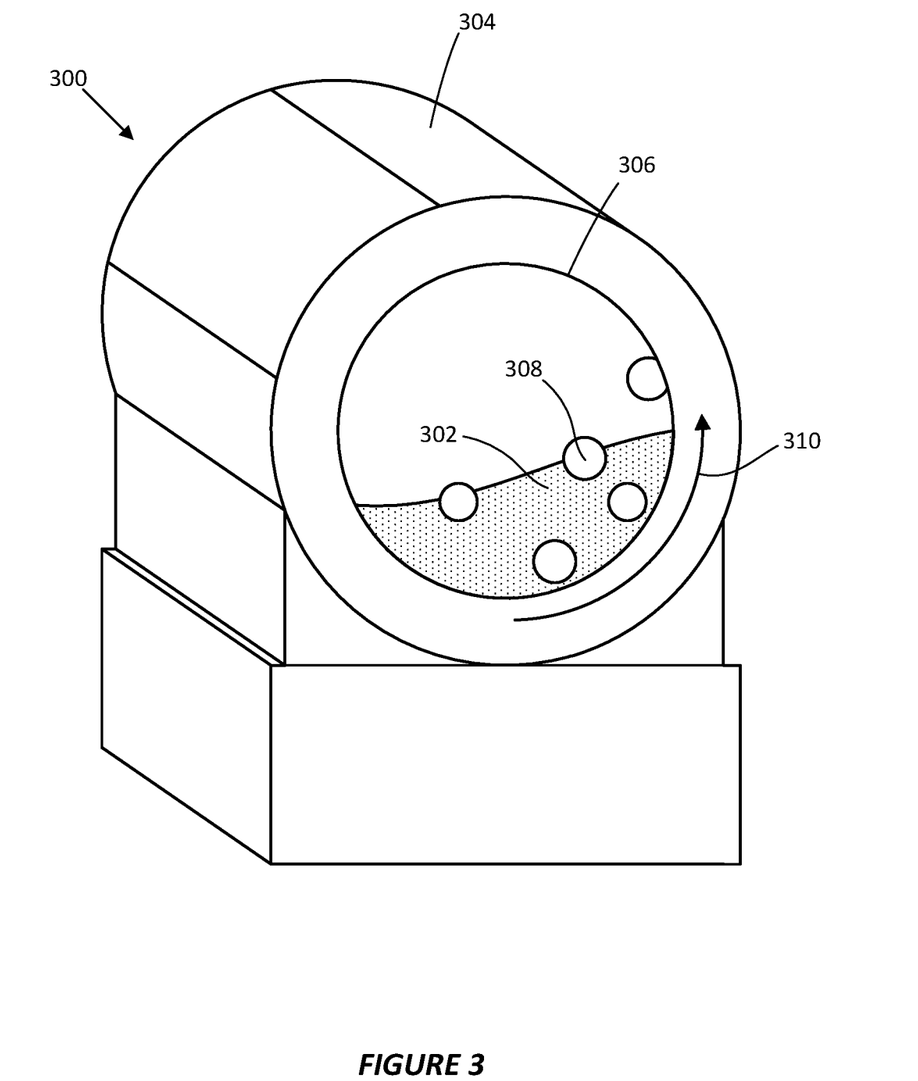
FIG. 3 is a perspective view depicting a ball mill used in the system of FIG. 1.

With reference now to FIG. 3, in preferred embodiments, feedstock 302 is processed inside of ball mill 300 in order to reduce the particle size and to normalize the material size distribution in the feedstock 302. In certain embodiments, the feedstock 302 is comprised solely of a dry component (e.g., a powder, pellets, or larger pieces of material made up of larger particle groups). In other embodiments, the feedstock 302 may also comprise a fluid, such as the carrier fluid described above. The ball mill 300 typically includes an outer, cylindrical, stationary housing 304 and a hollow, inner cylinder 306. In operation, feedstock 302 is placed within the inner cylinder 306 along with weighted balls 308 and the inner cylinder 306 rotates with respect to stationary housing 304 in a rotation direction 310. The inner cylinder 306 is typically driven in the rotation direction 310 by a motor or other driving means (not shown). As the inner cylinder 306 rotates within the housing 304, the weighted balls 308 are lifted upward and fall onto the feedstock 302. The falling action of the weighted balls 308 and the resulting collision with the feedstock 302 results in bonds of the feedstock 302 being broken and a reduction in particle size of the particles 202 making up the feedstock 302 from a first particle size to a second, smaller particle size.

Next, the working fluid 302' may be provided to the vortexer 400 after being processed in the ball mill 300. In certain embodiments, the feedstock 302 is processed entirely and exclusively inside of a vortexer 400 (i.e., without being processed in a ball mill or in other equipment in order to achieve the desired particle size). However, in the illustrated embodiment, use of vortexer 400 is only a single step in a multi-step process that involves other equipment and processing steps.

Figure 4:
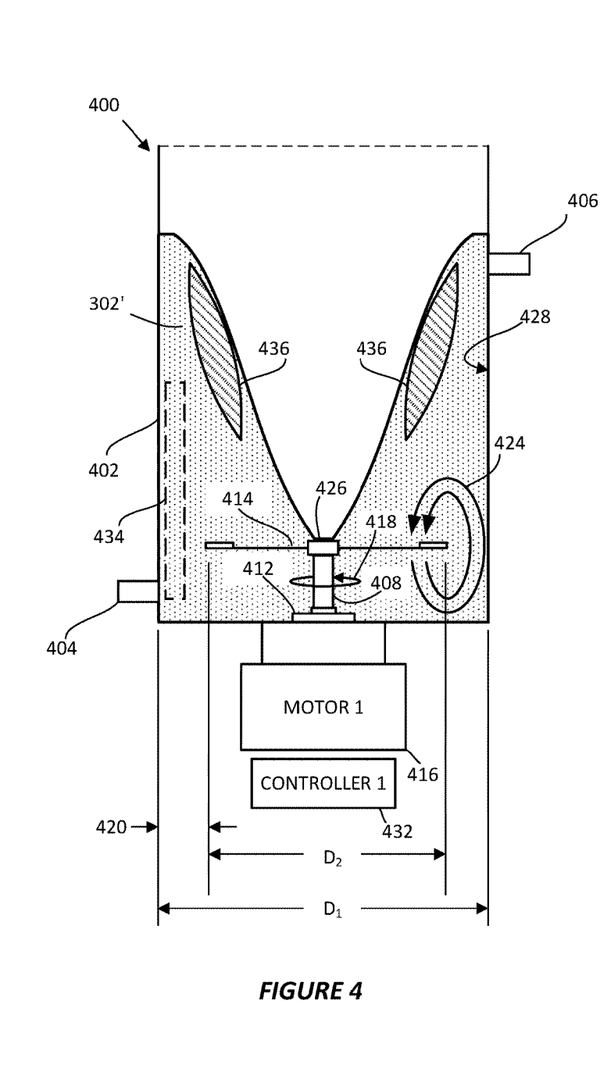
FIG. 4 is an elevation view of an interior of a vortexer according to an embodiment of the present invention.

With reference to FIG. 4, a cutaway of a vortexer 400 according to one embodiment of the present invention is shown. The vortexer 400 includes a cylindrical tank 402 having an inlet 404 and an outlet 406. Disposed within the tank 402 is a single drive shaft 408 that is rotatably mounted to a sealed lower bearing 412. The drive shaft 408 is attached to drive motor 416, which rotates the drive shaft within the tank 402 in rotation direction 418. Rotation of the drive shaft 408 and the motor 416 are controlled by controller 432. Although a motor 416 is depicted, other means of rotating the drive shaft are contemplated, including a pulley-based, gear-based, or hydraulic-based drive system.

Figure 5A:
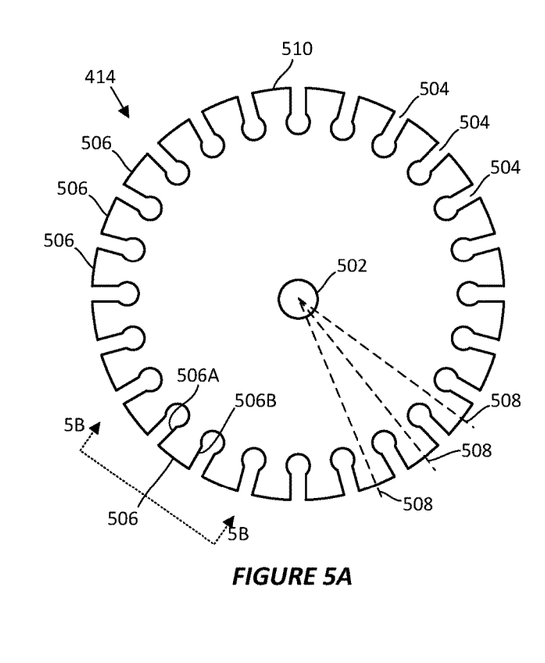
FIG. 5A is a top view depicting a shear head of the vortexer of FIG. 4.
Figure 5B:
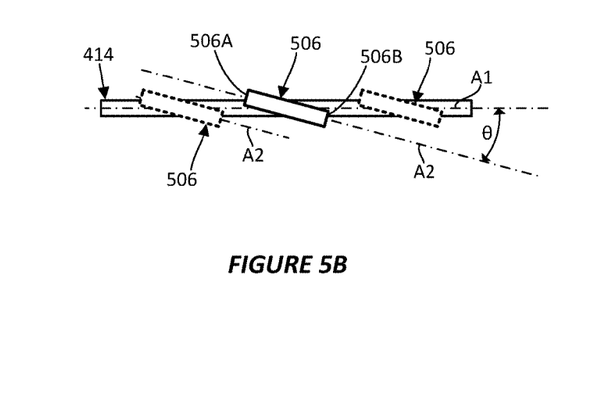
FIG. 5B is an end view of a single interstitial finger of the shear head shown in FIG. 5A and taken along line "5B-5B"

With continued reference to FIG. 4 and with further reference to FIGS. 5A and 5B, affixed to the drive shaft 408 is at least one shear head 414, which is configured to rotate with the drive shaft. In other embodiments, several shear heads 414 may be located within tank 402 and mounted to drive shaft 408 or to another (i.e., a second) drive shaft, such as a top-mounted drive shaft located at the top of the tank. It is contemplated that each of the shear heads 414 may be configured to rotate with (or counter to) the rotation of the drive shaft 408. In certain cases, each of the shear heads 414 rotate at the same speed and in the same direction. However, in other cases, shear heads 414 may rotate in different directions (e.g., counterclockwise and clockwise) and/or at different speeds.

Shear head 414 is generally circular in shape with a central hole 502 that is sized to receive a portion of the drive shaft 408. Preferably, the shear head 414 includes an attachment mechanism 426 to attach the shear head to the drive shaft 408 and to transmit rotational force from the drive shaft to the shear head. Suitable attachment mechanisms 426 include shaft collars, bushings, key stock, and the like.

Each shear head 414 includes a plurality of keyhole-shaped slots 504 disposed in perimeter edge 510 around the entire shear head as well as interstitial fingers 506 formed between each adjacent pair of slots. Slots 504 may be tuned or customized with different sizes, shapes, and spacing in order to provide different flow characteristics in the working fluid within the vortexer 400. In certain embodiments, the fingers 506 may be twisted, contoured, deformed, etc. about a central axis 508, where each such central axis extends through the center of center hole 502 and through the center of one of the fingers 506. This provides an angle of attack $\theta$ that is measured between axis A1 and axis A2, where axis A1 extends longitudinally through the shear head 414 and axis A2 extends longitudinally through the interstitial finger 506. In certain embodiments, this results in each twisted finger having an elevated first edge 506A and an opposite depressed or lowered second edge 506B. The angle of attack $\theta$ may range from 0° (i.e., parallel with the shear head 414) to 90° (i.e., orthogonal to the shear head). In certain embodiments, the angle of attack is between 20° and 90°. In other embodiments, the angle of attack is between 20° and 60°. In certain embodiments, the angle of attack is approximately 45°. The preferred angle of twist may change depending on a number of factors, including, e.g., the viscosity of the carrier fluid. In preferred embodiments, for more viscous fluids, a smaller angle of attack is used, and for less viscous fluids, a larger angle of attack is used. For example, when the carrier fluid is an acetone and water mixture, the angle of twist preferably ranges from 20°-60°. In preferred embodiments, the angle of attack selected is suitable for inducing desirable flow states of the working fluid within the vortexer 400.

Preferably, the tank 402 and the shear heads 414 are sized to provide a shear gap 420 that is located between the perimeter edge 510 of the shear head and an interior surface 428 of the tank 402. More particularly, the shear gap 420 forms an annulus that extends from the interior diameter D1 of the vortexer 400 to the outer diameter D2 of the perimeter edge 510. The shear gap 420 functions as a "relaxation zone" for the particles after they experience high shear forces at the perimeter edge 510 of the shear head 414. In preferred embodiments, the shear head 414 and the vortexer 400 are sized such that the ratio of D2/D1 is between 0.5 and 0.9.

When the vortexer 400 is in operation, the working fluid enters the tank 402 through the inlet 404. As the working fluid enters the tank 402, motor 416 is controlled by controller 432 and causes drive shaft 408 to rotate shear head 414 in rotation direction 418 (or opposite to direction 418) at a preselected speed through the working fluid. The speed of rotation of the shear head 414 is selected to achieve desirable localized Reynolds numbers within the tank 402, taking into account the specific viscosity of the working fluid 302'. As the drive shaft 408 reaches the preselected or desired speed, the shear heads 414 cause the working fluid, including particularly large particles in the working fluid, to swirl within the tank 402 and to follow recirculating flow path 424 through the vortexer 400.

As the working fluid follows flow path 424, the movement of the working fluid subjects the particles within the working fluid to varying shear forces. For example, very high shear forces are experienced in the area immediately surrounding the perimeter edge 510 of the shear head 41. Preferably, the working fluid 302' will experience Reynolds numbers of at least $10^6$ at the perimeter edge 510 of the shear head 414. Preferably, little to no shear forces are experienced in the "relaxation zone" provided by the shear gap 420. This brief relaxation is important because it enables the solvent to penetrate between layers of the particle. This is sometimes called "wetting." Then, shear forces (sometimes called "micro shear" forces), which are generally less than the forces experienced near the shear head 414, are experienced in a perimeter area 434 that is located adjacent the interior surface of tank 402 and that surrounds the entire shear head 414. In this perimeter area 434, the working fluid 302' preferably experiences Reynolds numbers of around $10^3$. Lastly, in a vortex holding area 436 that is located above the shear head 414, the working fluid 302', including particularly small particles, experiences little to no shear force.

As such, in operation, the working fluid preferably passes through at least three distinct shear areas within the vortexer 400, where differing amounts of shear force are experienced in each area. Preferably, the working fluid 302' passes first through a high-shear force zone at the perimeter edge 510 of the shear head 414, where the highest shear forces are experienced. Then, lower (or possibly no) shear forces are experienced in the shear gap 420. The working fluid 302' also experiences a second high-shear force when coming into contact with the interior surface 428 of the tank 402. The working fluid 302' may then be recirculated back into the first high-shear force zone, as shown by flow path 424. As a result of and depending on these shear forces, some or all of the bonds 208, 210 (FIG. 2) of the particle group 202 of the working fluid may be severed. Severing these bonds 208, 210 reduces the particle size of the particle group 202 from a second particle size (i.e., the particle size following processing in ball mill 300) to a third and even smaller particle size. Bonds are initially severed in the first high-shear force zone resulting in newly exposed individual particles 204 and previously unexposed layers 206 within the particle group 202. The newly exposed particles 204 and layers 206 are exposed to, and sufficiently wetted by, the carrier fluid within the relaxation zone. The now-wetted individual particles 204 and layers 206 then pass to the second high-shear zone where they are further micronized or exfoliated. In certain embodiments, some or all of at least one of the inter-planar bonds 210 and intra-planar bonds 208 are severed, resulting in a general reduction in particle size of particle groups 202. In other embodiments, primarily (or only) the intra-planar bonds 208 are severed. In other embodiments, primarily (or only) the inter-planar bonds 210 are severed. Two or more vortexers may be arranged in a series to further process the working fluid and reduce the particle size. Additionally or alternatively, two or more vortexers may be arranged in parallel with one another to provide a higher throughput (i.e., processing speed).

Figure 6:
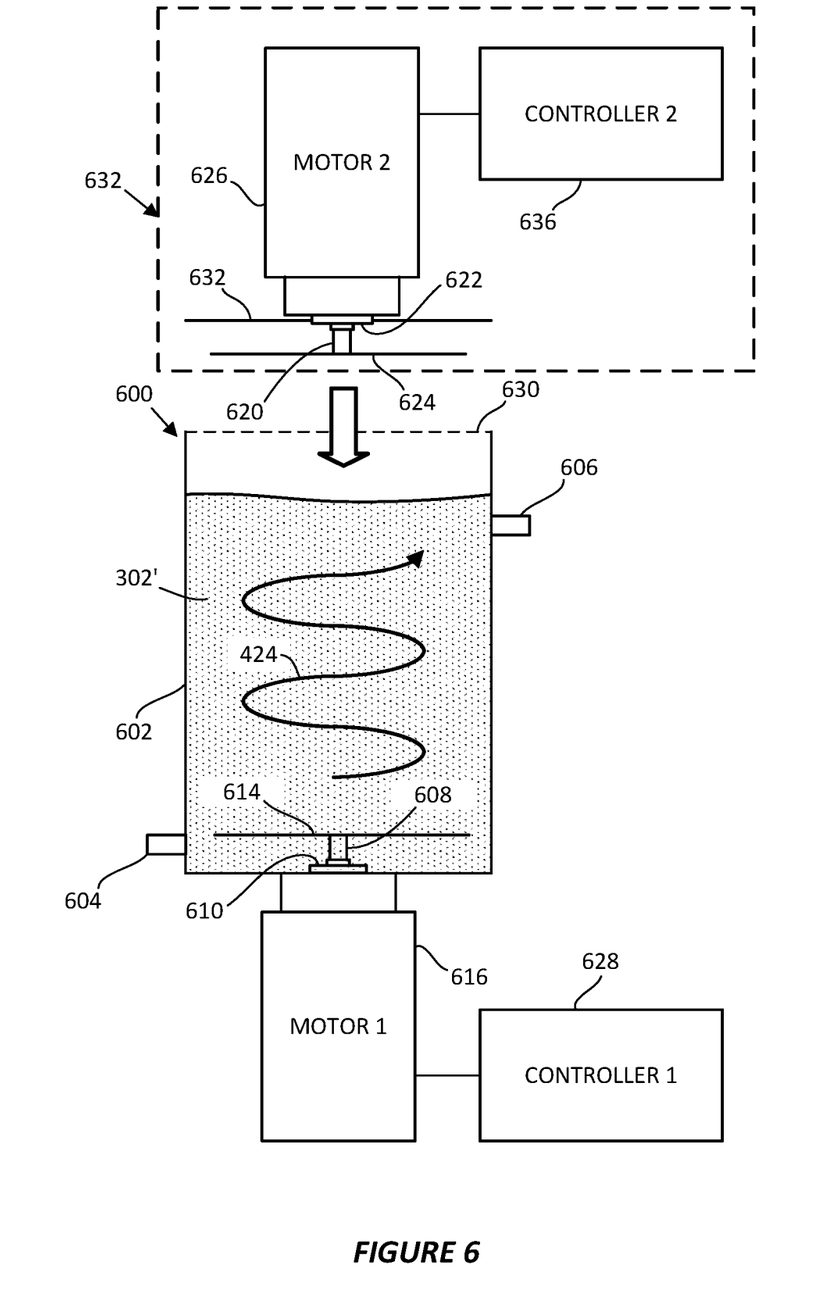
FIG. 6 is an elevation view of an interior of a vortexer according to an alternative embodiment of the present invention.

FIG. 6 depicts an alternative embodiment of a vortexer 600 and shown filled with working fluid 302'. Like vortexer 400, vortexer 600 includes a cylindrical tank 602 having an inlet 604 for allowing working fluid 302' to pass into the tank and an outlet 606 for allowing working fluid to pass out of the tank. A lower drive shaft 608 is rotatably mounted at a lower interior portion of the tank 602 via a sealed lower bearing 610. A lower shear head 614, which is structurally and functionally similar to shear head 314 (FIG. 5A), is fixedly mounted to one end of the lower drive shaft 608. The opposite end of the lower drive shaft 608 is mounted to a lower drive motor 616 (i.e., MOTOR 1), and is controlled by lower controller 628 (i.e., CONTROLLER 1). The lower drive motor 616 turns the lower drive shaft 608 and, in turn, the lower shear head 614.

In certain embodiments, vortexer 600 is provided with only a single shear head 614. More preferably, the single shear head 614 is located at the bottom of the tank 602 so that an opening 630 is provided at the top of the tank. This opening 630 provides easy access to the interior of the tank 602, including for maintenance, loading/unloading, inspections, etc. This opening 630 may be covered by a removable cap (not shown), which may be removably attached by fasteners (also not shown) or other fastening means, in order to seal the tank 602 while it is in use.

In other embodiments, the removable cap may be replaced with a second, free-floating and removable shear head assembly 632 that may be placed into the opening 630 and removably mounted to the tank 602. The removable shear head assembly 632 includes an upper drive shaft 620 that may be rotatably mounted via a sealed upper bearing 622 within cap 634, which may be removably mounted to the tank 602. An upper shear head 624, which is structurally and functionally similar to shear head 314 (FIG. 5A), is fixedly mounted to one end of the upper drive shaft 620. The opposite end of the upper drive shaft 620 is mounted to an upper drive motor 626 (i.e., MOTOR 2), and is controlled by upper controller 636 (i.e., CONTROLLER 2). The upper drive motor 626 turns the upper drive shaft 620 and, in turn, the upper shear head 24.

As discussed above, each of the drive shafts may be directly driven by a corresponding motor, which motors may be over-driven or under-driven as necessary to produce a desirable speed in the drive shaft and shear head in order to achieve the shear and other forces within the tank 602 necessary to process the feed material. In certain instances, a single motor and shear head are appropriate whereas in other instances, multiple shear heads or motors are appropriate. In either case, whether using a single shear head or more than one shear head, the vortexers described herein may be operated in either a batch mode or in a continuous mode of operation.

Next, in fluid dynamics, Taylor-Couette flow refers to the flow of a viscous fluid that is confined in an annular gap located between two rotating concentric cylinders. A Taylor-Couette fluid flow reactor or Taylor-Couette Flow Inducing Device (TCFID) may be used to induce Taylor-Couette flow in a given fluid, which can produce ultra-high Reynolds numbers, which is indicative of turbulent flow where shear forces are high and can exfoliate or micronize particles suspended within a carrier fluid. In general, the fluid in a TCFID flows in the rotating direction as the inner cylinder rotates, but centrifugal and Coriolis forces tend to cause the fluid to travel outwards towards the outer cylinder. As a result, the fluid becomes more unstable and experiences increased mixing, and particles are exposed to greater forces as the speed of rotation is increased. Furthermore, the longer the carrier fluid remains within the TCFID (i.e., the "dwell time"), the longer it is exposed to the shear forces and, consequently, the smaller the particles carried by that fluid are reduced in size. As a result, viscous fluids can be very precisely mixed and the particles that they carry can be very precisely reduced in size in a TCFID.

Figure 7A:
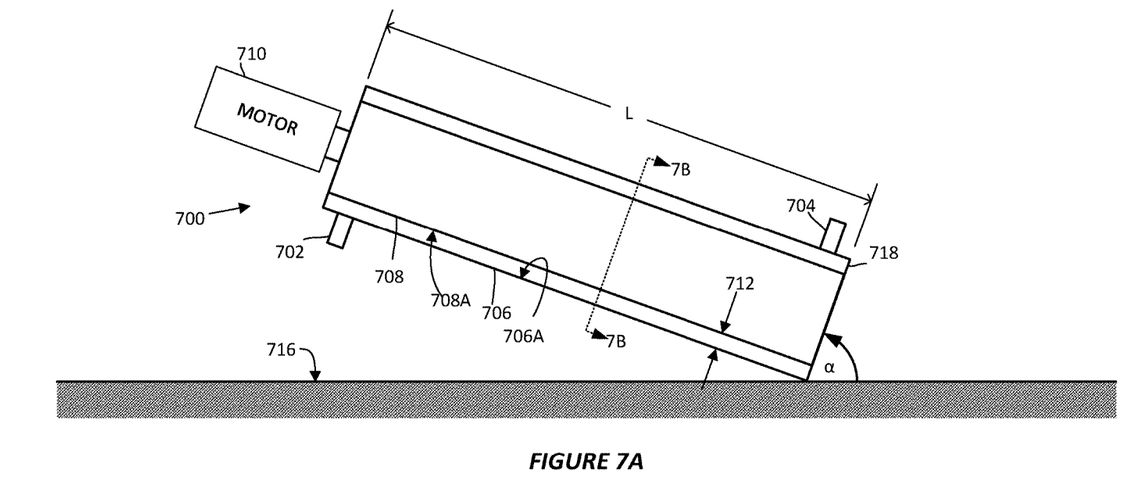
FIG. 7A is an elevation view of an interior of a Taylor-Couette flow-inducing device used in the system of FIG. 1 according to an embodiment of the present invention.
Figure 7B:
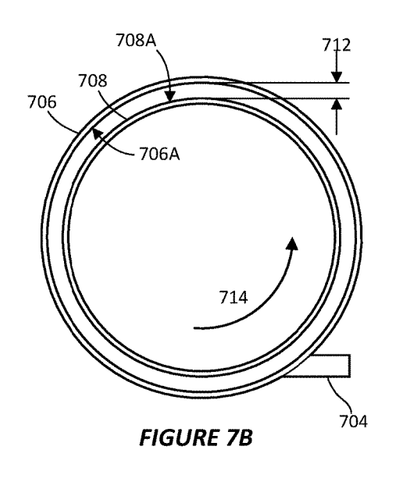
FIG. 7B is a sectional view of the Taylor-Couette flow-inducing device shown in FIG. 7Af along line "7B-7B"

With reference now to FIG. 7A and FIG. 7B, the illustrated TCFID 700 includes an outer cylinder 706 having length L, a coaxial inner cylinder 708 that preferably has the same length L as the outer cylinder, and a drive motor 710 for providing relative rotational motion of the inner cylinder with respect to the outer cylinder (i.e., one of the cylinders can be rotated with respect to a stationary other cylinder or both cylinders may be rotating). In certain embodiments, the TCFID 700 may include a second motor (not shown) for driving either the inner cylinder 708 or outer cylinder 706 in a rotational direction and at a rotational speed that is the same as or that is different from the rotational speed and direction of the other cylinder. The inner cylinder 708 may be hollow or may be solid. A hollow inner cylinder 708 reduces the overall rotating mass as well as the moment of inertia in order to facilitate achieving a desired speed of rotation of the inner cylinder.

The outer cylinder 706 and inner cylinder 708 are sized and configured to provide a gap 712 between them. This gap 712 is measured radially between an inward-facing surface 706A of the outer cylinder 706 and an outward-facing surface 708A of the inner cylinder 708 and is sized and configured to receive and hold the working fluid as it is being processed within the TCFID 700. Further, the gap 712 is sized to produce an ideal Reynolds number and Taylor number to exfoliate and/or micronize particles suspended in the working fluid. In certain embodiments, inner cylinder 708 has an outside diameter of around 1 m and the gap 712 ranges from 20-30 mm. The TCFID 700 includes an inlet 702 and an outlet 704 for allowing the working fluid to enter and exit the gap 712 of the TCFID, respectively. The inlet 702 and outlet 704 are each preferably disposed on the outer cylinder 706 or in another suitable location. In certain embodiments, the TCFID 700 is oriented horizontally or at a downward angle $\alpha$ to allow for gravity-assisted flow of the working fluid through the device during processing and/or to avoid the need for intermediate process pumps or holding tanks where the exfoliated or micronized materials may re-aggregate or re-combine. In the illustrated embodiment, the angle $\alpha$ is measured between a ground surface 716 upon which the TCFID is placed and a bottom surface 718 of the TCFID. Preferably, angle α ranges from about 0° to about 60°. In certain embodiments, the preferred angle α ranges from about 0° to about 45°. As with the vortexers discussed above, two or more TCFIDs may be arranged in a series to provide successive processing of the working fluid in order to further reduce the particle size. Additionally or alternatively, two or more TCFIDs may be arranged in parallel with one another to provide a higher throughput (i.e., processing speed).

In operation, in certain embodiments, the working fluid is provided to the TCFID 700 from the vortexer 400, as shown in FIG. 1. The working fluid passes into the TCFID 700 via inlet 702 and then into gap 712 between the outer cylinder 706 and inner cylinder 708. The motor 710 then drives either the outer cylinder 706 or inner cylinder 708 with respect to the other cylinder in order to provide relative motion between them, such as in rotation direction 714. Within the TCFID 700, various speeds and rotational directions of one cylinder 706, 708 relative to the other cylinder cause the working fluid to exert forces on particles, where those forces are sufficient to reduce their particle size to a selected particle size. In particular, the rotation of the cylinder(s) subjects the working fluid and the particles to shear forces. As described above, these shear forces may be used to sever some or all of the bonds within the particle group 202. Different particles of feedstock suspended within the working fluid require differing types of flow (e.g., laminar or turbulent) and a specific Reynolds number and Taylor number to achieve the desired size reduction. The rotational speed and direction of the cylinders 706, 708, within the TCFID 700 are altered based on the specific viscosity of the working fluid 302' to achieve the required Reynolds number and Taylor number within the fluid. It may be appreciated that the precise Reynolds number and Taylor number needed to achieve the desired result will depend on the working fluid, the particles forming the working fluid, and the desired end product. Thus, processing the working fluid within the TCFID 700 further reduces the particle size of particle group 202 from the third particle size to a fourth and smaller particle size.

The working fluid should remain within the TCFID 700 and continue to be processed (i.e., circulating within gap 712) for a specified dwell time, based on length L and the flow state of the working fluid within the gap, until the desired fourth particle size is obtained. As the TCFID 700 rotates, the working fluid within experiences a slight pumping effect, generally extending the dwell time. In certain embodiments, the dwell time is a value resulting from the specific properties of the working fluid, the rotational speed and direction, and the length L of the TCFID 700 with length L having the largest effect on the dwell time. In other embodiments, the dwell time is between 5 and 15 minutes. Upon reaching the desired dwell time, the working fluid passes through outlet 704 to the homogenizer.

Figure 8A:
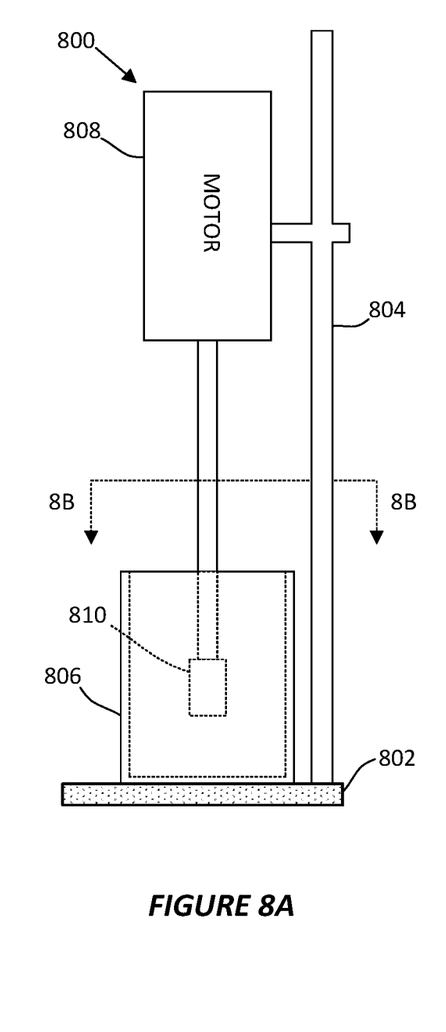
FIG. 8A is an elevation view depicting a homogenizer used in the system of FIG. 1 according to an embodiment of the present invention.
Figure 8B:
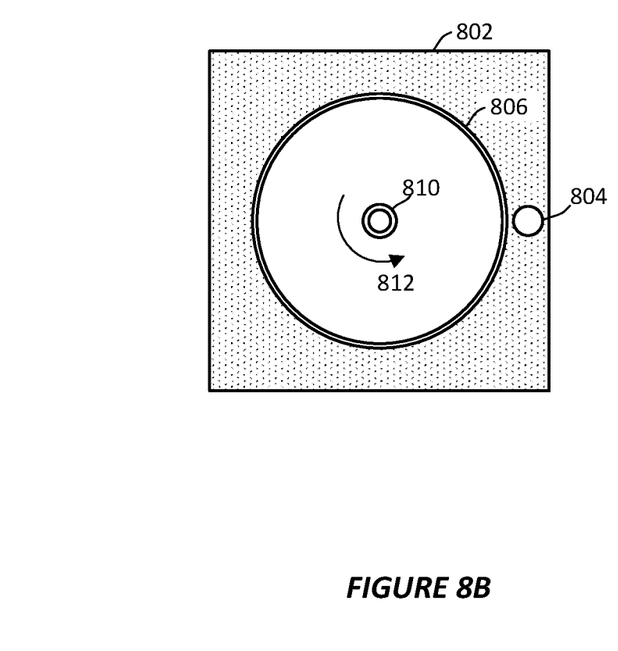
FIG. 8B is a sectional view of the homogenizer shown in FIG. 8A and taken along line "8B-8B"

With reference now to FIG. 8A and FIG. 8B, after being processed by the TCFID 700, the working fluid may be provided to the homogenizer 800 in order to normalize the size and distribution of the particle suspended within the working fluid. In the illustrated embodiment, homogenizer 800 includes a base 802, motor stand 804, mixing vessel 806, drive motor 808, and a mixing head 810. To use the homogenizer 800, the working fluid is placed within mixing vessel 806 along with the mixing head 810. The motor 808 then drives the mixing head 810 in a rotation direction 812 (or opposite direction 812) to mix the working fluid. As the mixing head 810 rotates, the distribution and size of the particles 202 within the working fluid is normalized (i.e., made homogeneous). Various commercial homogenizers that are readily available are suitable for this homogenization step. Although the homogenizer 800 shown is a mixer-type, any other suitable commercially available homogenizer will suffice. Examples include an ultrasonic homogenizer, a high-pressure homogenizer, a high shear homogenizer, a bead mill homogenizer, or a tissue homogenizer.

In certain embodiments, after homogenization, the particles within the working fluid are functionalized. This functionalization occurs through either a bubble column reactor 104 or a fluidized bed. The bubble column reactor 104 introduces a gaseous phase or constituent (e.g., carbonization to introduce $CO_2$) and imparts desirable characteristics on the particles of feedstock 302 suspended within the working fluid.

After homogenization, the working fluid is provided to a dryer, where the working fluid is separated into constituent parts, namely, the feedstock and the carrier fluid. In certain embodiments, after being separated from the carrier fluid in the dryer, the processed feedstock is a granular material having a reduced particle size compared to the particle size of the original feedstock. A variety of dryer types can provide adequate separation of the reduced feedstock from the carrier fluid. For example, the dryer may comprise a spray dryer, a centrifuge, a mechanical filtration system, or other similar dryer types. In certain preferred embodiments, the drying process includes a secondary step of capturing and recycling the separated carrier fluid for later use in subsequent particle-size reduction processes. Certain dryers, such as the spray dryer or fluidized bed, require the step of condensing any vaporized carrier fluid back into a liquid form before it can be reused.

Figure 9:
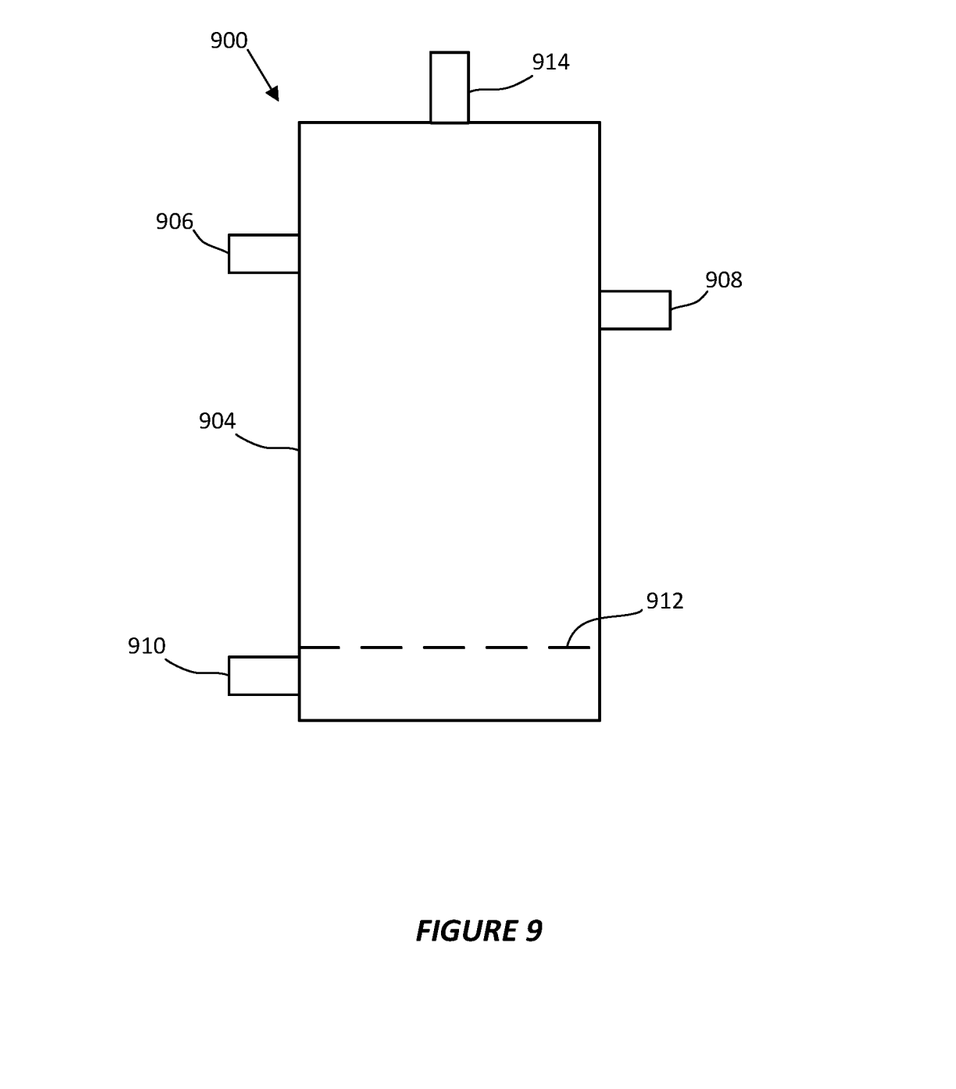
FIG. 9 is an elevation view depicting a dryer used in the system of FIG. 1 according to an embodiment of the present invention.

With reference to FIG. 9, a dryer 900 in the form of a fluidized bed is shown. The fluidized bed 900 includes a central tank 904 having a material inlet 906 and a material outlet 908. The tank 904 includes a gas inlet 910, a perforation plate 912, and a gas outlet 914. In preferred embodiments, material inlet 906 is provided with a spray atomizer (not shown) for atomizing the working fluid in order to produce a fine, consistent mist that is sprayed into the central tank 904. As the atomized working fluid enters the tank 904, gas is also supplied to the tank 904 via gas inlet 910. Perforation plate 912 ensures an even distribution of the supplied gas as it travels upward through the tank 904 towards the gas outlet 914. The supplied air may vary in temperature and/or in velocity depending on the desired resulting functional properties of the final granular material. As the supplied gas passes from the gas inlet 910, through the perforation plate 912, and proceeds to the gas outlet 914, the atomized working fluid interacts with the supplied gas. This interaction causes a separation of the carrier fluid from the feedstock. The atomized carrier fluid and the supplied air exit the tank through the gas outlet 914. The feedstock, now in a granular form separate from the carrier fluid, exits the central tank 904 through the material outlet 908. In certain embodiments, the gas outlet 914 flows into a condenser (not shown), which captures and concentrates the carrier fluid vapor back into a liquid form for reuse in further particle-size reduction processes. In certain embodiments, the supplied air includes a reagent gas. The reagent gas is chosen to impart desirable properties on (i.e., to functionalize) the reduced-size particles. Example reagent gases include but are not limited to chlorine, oxygen, methane, ammonia, and isobutene. After drying, the granular feedstock is then packaged for consumption/use.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A particle size reducing method comprising the steps of:
   providing a mechanochemical processing system comprising a ball mill, a vortexer, a Taylor-Couette flow-inducing device (TCFID), a homogenizer, and a dryer;
   providing a feedstock comprised of a particle group having a first particle size and formed by intra-planar bonds connecting particles within a single layer together and inter-planar bonds that are weaker than the intra-planar bonds and that connect particles of one layer together with particles of a different layer;
   with the ball mill, reducing a particle size of the particle group from the first particle size to a smaller second particle size;
   mixing the feedstock with a carrier fluid to create a working fluid wherein the particles of the particle group is suspended within the carrier fluid;
   using the vortexer, reducing the particle size of the feedstock from the second particle size to a smaller third particle size to produce a second reduced working fluid;
   with the TCFID, reducing the third particle size of the feedstock to a smaller fourth particle size to produce a third reduced working fluid;
   with the homogenizer, normalizing a distribution of the particles in the third reduced working fluid; and
   in the dryer, separating the carrier fluid of the working fluid from the particles to produce a granular material.

2. The method of claim 1 further comprising the step of holding the working fluid within a gap formed between a first cylinder and a second cylinder of the TCFID for a dwell time while at least one of the first cylinder or the second cylinder rotates in order to induce a desired Reynolds number within the working fluid.

3. The method of claim 2 wherein the working fluid is held within the gap as the first cylinder rotates at a first speed and in a first direction and the second cylinder rotates at a second speed and in a second direction.

4. The method of claim 3 wherein the first direction is opposite the second direction.

5. The method of claim 3 wherein the first direction is a same rotational direction as the second direction.

6. The method of claim 1 further comprising the step of atomizing the third reduced working fluid into a fluidized bed using a spray atomizer and passing a gas through the fluidized bed in order to dry and separate the particles from the third reduced working fluid.

7. The method of claim 1 further comprising the step of atomizing the third reduced working fluid into a fluidized bed using a spray atomizer and passing a gas through the fluidized bed in order to functionalize the particles suspended within the carrier fluid.

8. The method of claim 1 further comprising the step of functionalizing the particles suspended within the carrier fluid in a bubble column reactor.

9. The method of claim 1 wherein the granular material is selected from the group consisting of: hexagonal boron nitride, MXene, Graphene, Graphene Oxide, Reduced Graphene Oxide, Functionalized Graphene, Non-Functionalized Graphene, Micronized Graphite, Molybdenum Disulfide, Nanoclay, Niobium Diselenide, Lead, Lead Oxide, or Polymer Gel.

10. The method of claim 1 further comprising the step of capturing and condensing the carrier fluid that is separated from the granular material by the dryer.

11. The method of claim 10 wherein the dryer is a centrifuge configured to capture and condense the carrier fluid.

12. The method of claim 1 wherein the dryer is a filtration system, the method further comprising the steps of separating the granular material from the carrier fluid and capturing the carrier fluid using the filtration system.

13. The method of claim 1 wherein the carrier fluid comprises at least one of the following: a solvent, a surfactant, a viscosity modifier, a surface tension modifier, an intercalation agent, a swelling agent, or a homogenizing agent.

14. The method of claim 1 wherein the carrier fluid is comprised of acetone and water.

15. The method of claim 1 further comprising the step of using one or more vacuum traps to transfer the working fluid between at least two components of the processing system.

* * * * *